United States Patent
Krok et al.

(10) Patent No.: US 8,922,175 B2
(45) Date of Patent: Dec. 30, 2014

(54) SYSTEM AND METHOD FOR OPERATING CAPACITOR BANKS

(75) Inventors: Michael Joseph Krok, Clifton Park, NY (US); Sahika Genc, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 709 days.

(21) Appl. No.: 13/076,475

(22) Filed: Mar. 31, 2011

(65) Prior Publication Data

US 2012/0249092 A1 Oct. 4, 2012

(51) Int. Cl.
*G05F 1/70* (2006.01)
*H02J 3/18* (2006.01)
*H02J 3/38* (2006.01)
*G06Q 10/06* (2012.01)
*G06Q 50/00* (2012.01)
*G06Q 50/06* (2012.01)
*H02J 3/00* (2006.01)

(52) U.S. Cl.
CPC .............. *H02J 3/1828* (2013.01); *H02J 3/383* (2013.01); *H02J 3/386* (2013.01); *G06Q 10/06* (2013.01); *G06Q 50/00* (2013.01); *G06Q 50/06* (2013.01); *H02J 2003/003* (2013.01); *Y02E 40/30* (2013.01); *H02J 3/381* (2013.01); *Y02E 10/563* (2013.01); *Y02E 10/763* (2013.01); *H02J 3/382* (2013.01); *Y04S 10/54* (2013.01)
USPC ........................................................ 323/209

(58) Field of Classification Search
CPC ........... G05F 1/70; H02J 3/383; H02J 3/1828; G01R 19/2513
USPC ................. 323/205, 207, 255, 256, 340, 341; 700/286, 291, 295, 297, 298; 705/7.29, 705/7.31
See application file for complete search history.

(56) References Cited

U.S. PATENT DOCUMENTS 4,365,190 A  12/1982  Pasternack et al.
(Continued)

FOREIGN PATENT DOCUMENTS

| EP | 388479 B1 | 12/1995 |
|---|---|---|
| EP | 923181 B1 | 3/2004 |
| WO | 2010045726 A1 | 4/2010 |

OTHER PUBLICATIONS

Reactive Power Optimization Control of Wind Farms with Fixed-Speed Wind Turbine Generators, Su et al., 2008.*

(Continued)

*Primary Examiner* — Adolf Berhane
*Assistant Examiner* — Yemane Mehari
(74) *Attorney, Agent, or Firm* — Nitin N. Joshi (57) ABSTRACT

A method of operating capacitor banks includes obtaining a reactive power shortage curve forecast for a time period. At least one capacitor bank power schedule curve is generated to supply reactive power to the power grid during the time period. The at least one capacitor bank power schedule curve is updated to generate an optimized capacitor bank power schedule curve to reduce the area between the reactive power shortage curve and the capacitor bank power schedule curve. The method also includes providing switching signal commands for operating capacitor banks based on the optimized capacitor bank power schedule curve.

20 Claims, 5 Drawing Sheets

(56) References Cited

U.S. PATENT DOCUMENTS

| | | | |
|---|---|---|---|
| 4,645,997 A | | 2/1987 | Whited |
| 5,670,864 A | * | 9/1997 | Marx et al. .................... 323/211 |
| 2008/0106241 A1 | | 5/2008 | Deaver et al. |
| 2009/0187284 A1 | * | 7/2009 | Kreiss et al. .................. 700/291 |
| 2009/0265042 A1 | | 10/2009 | Mollenkopf et al. |
| 2010/0332599 A1 | * | 12/2010 | Tapolcai et al. ............... 709/205 |
| 2011/0093127 A1 | * | 4/2011 | Kaplan ......................... 700/292 |

OTHER PUBLICATIONS

M. Dixon, "Innovative Volt/VAR Management Provides Payback," 2001 IEEE/PES Transmission and Distribution Conference and Exposition, vol. 1, pp. 461-468, Oct. 28, 2001-Nov. 2, 2001.

K.R.C. Mamandur et al., "Optimal Control of Reactive Power Flow for Improvements in Voltage Profiles and for Real Power Loss Minimization", IEEE Transactions on Power Apparatus and Systems, vol. PAS-100, No. 7, pp. 3185-3194, Jul. 7, 1981.

* cited by examiner

SYSTEM AND METHOD FOR OPERATING CAPACITOR BANKS

BACKGROUND

The invention relates generally to an electric power grid and more specifically to control of capacitor bank switching in the power grid.

The basic structure of an electric power system comprises various hardware elements such as generators, transformers, and real-time monitoring equipment, and software such as power flow analysis software, fault detection software, and restoration software for generation, transmission, and distribution of electricity.

In general, power system operators ensure the quality of the power supplied to the customers by maintaining the load bus voltages within their permissible limits. Any changes to the system configuration or in power demands can result in higher or lower voltages in the system. This situation can be improved by reallocating the reactive power generated in the system by adjusting transformer taps, changing generator voltages, and by switching VAR sources such as capacitor banks or static VAR compensators (SVCs).

Capacitor banks in the power grid are often used to provide leading reactive power compensation or power factor correction. The use of capacitor banks has increased because they are relatively inexpensive, easy and quick to install, and can be deployed virtually anywhere in the network. Capacitor bank installation has other beneficial effects on the system such as: improvement of the voltage at the load, better voltage regulation, reduction of losses, and reduction or postponement of investments in transmission.

Optimizing capacitor bank switching helps electric delivery companies minimize the cost of installing and maintaining equipment on a distribution feeder and achieve better performance from the available capacitor banks. There are various algorithms available for optimizing capacitor bank switching. However, most of these algorithms are combined with voltage control algorithms and thus lead to long convergence times. Further most of these algorithms result in certain capacitor banks being switched on and off more times in a day than desired. Frequent switching of capacitor banks degrades switching contacts of the capacitor banks and increases maintenance requirements and decreases lifetime.

Therefore, there is a need for an improved optimization approach to capacitor bank switching.

BRIEF DESCRIPTION

In accordance with an embodiment of the present invention, a method of operating capacitor banks in a power grid is provided. The method includes obtaining a reactive power shortage curve forecast for a time period and generating at least one capacitor bank power schedule curve to supply reactive power to the power grid during the time period. The method further includes updating the at least one capacitor bank power schedule curve to generate an optimized capacitor bank power schedule curve for reducing the area between the reactive power shortage curve and the capacitor bank power schedule curve. The method further includes providing switching signal commands for operating capacitor banks based on the optimized capacitor bank power schedule curve.

In accordance with another embodiment of the present invention a power grid system including a plurality of capacitor banks and a capacitor bank switching system is provided. The capacitor bank switching system includes a load forecast module to obtain a reactive power shortage curve for a time period and a capacitor bank scheduling module for generating at least one capacitor bank power schedule curve to supply reactive power to the power grid during the time period. The capacitor bank switching system also includes an optimization module to update the at least one capacitor bank power schedule curve and generate an optimized capacitor bank power schedule curve to reduce the area between the reactive power shortage curve and the capacitor bank power schedule curve. The capacitor bank switching system further includes a control circuitry to provide switching signal commands for operating capacitor banks based on the optimized capacitor bank power schedule.

In accordance with yet another embodiment of the present invention, a computer-readable medium comprising non-transitory computer-readable instructions of a computer program that, when executed by a processor, cause the processor to perform a method of operating capacitor banks in a power grid is provided. The method includes obtaining a reactive power shortage curve forecast for a time period and generating at least one capacitor bank power schedule curve to supply reactive power to the power grid during the time period. The method further includes updating the at least one capacitor bank power schedule curve to generate an optimized capacitor bank power schedule curve for reducing the area between the reactive power shortage curve and the capacitor bank power schedule curve. The method further includes providing switching signal commands for operating capacitor banks based on the optimized capacitor bank power schedule curve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
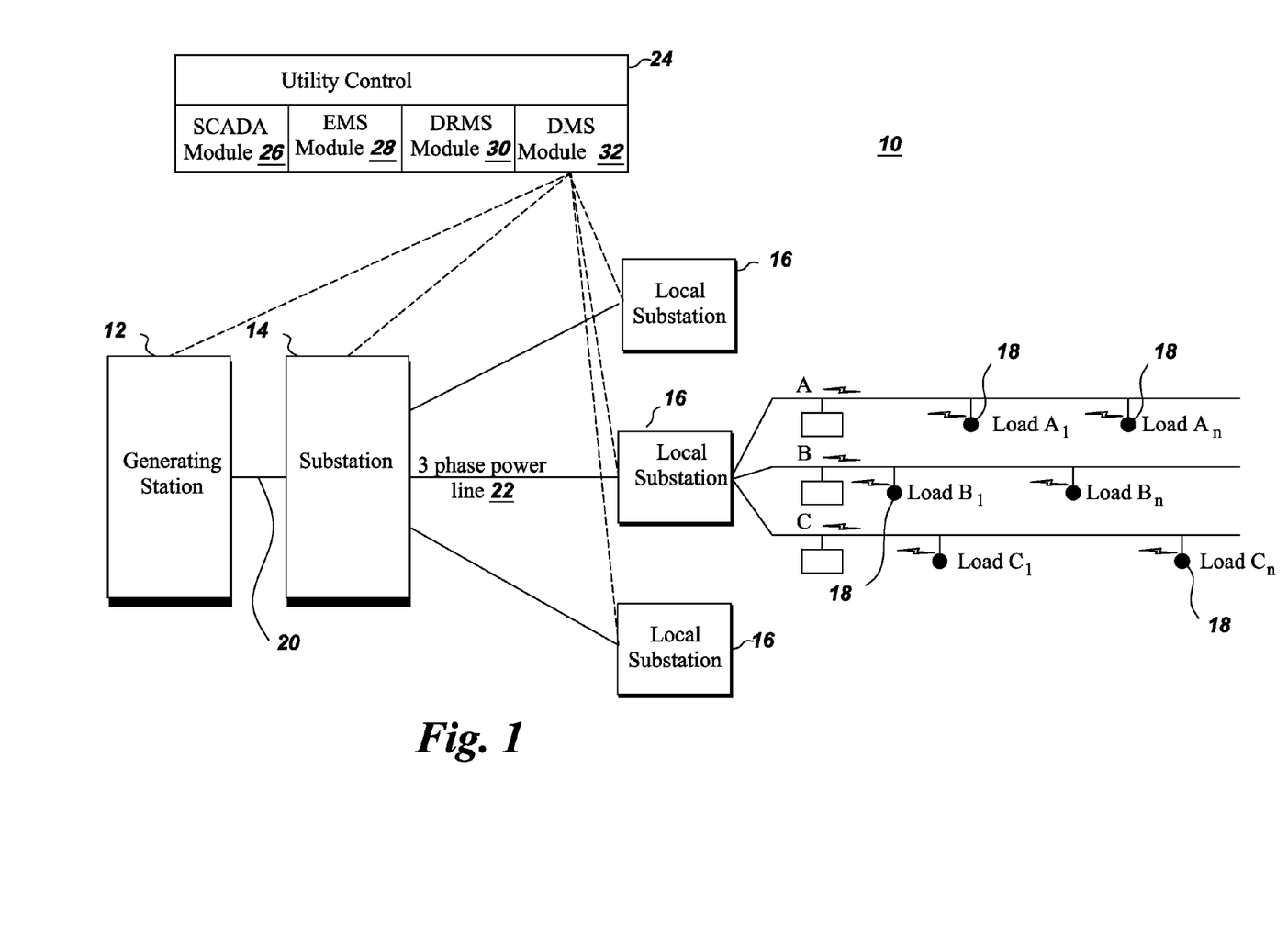
FIG. 1 is a diagrammatical representation of an overall electric system.

FIG. 1 illustrates a single line diagram of an overall electric system 10 from generation to utilization. The electric system 10 includes a generating station 12, a transmission substation 14, local substations or distribution substations 16 and loads 18. Generating station 12 may comprise a hydropower generating station, a thermal power generating station, a wind power generating station, or a solar power generating station, for example. Generating station 12 generates electricity at a generating station voltage which is typically in the range of 4 kV to 13 kV. The generating station voltage is stepped up to a higher transmission level voltage such as 110 kV and above by a generating station transformer (not shown) for more efficient transfer of the electricity.

The electricity at the transmission level voltage is transmitted to transmission substation 14 by primary transmission lines 20 that are configured to carry electricity long distances. At transmission substation 14, a reduction in voltage occurs for distribution to other points in the system through secondary transmission lines 22. Further voltage reductions for commercial and industrial or residential loads 18 may occur at distribution substation 16. The distribution substation 16 may supply electricity at voltages in the range of 4 kV to 69 kV, for example. The voltages may further by reduced by one or two more levels at distribution substation 16 or other local substations (not shown) receiving power from distribution substation 16 to supply the electricity to residential loads at lower voltages such as 120 V or 240 V. Capacitor banks (not shown) may be placed anywhere in the system such as at the transmission substation or distribution substation, for example.

A utility control center 24 is used in the system 10 for operation and maintenance of generating station 12, transmission substation 14, and distribution substations 16. Utility control center 24 receives data from these components and also provides control signals to these components. Loads 18 may communicate with their respective distribution substations 16 and thus the utility control center 24 may also receive and transmit information to and from the loads 18. Components of the utility control center 24 include a supervisory control and data acquisition (SCADA) system 26, an energy management system (EMS) 28, a demand response management system (DRMS) 30, and a distribution management system (DMS) 32. In one embodiment, some of these components may be provided separately in system 10 rather than being integrated in the utility control center 24.

As will be appreciated by those skilled in the art, SCADA usually refers to basic control and monitoring of field devices including breakers, switches, capacitors, reclosers, and transformers. EMS 28 coordinates and optimizes power generation and transmission, whereas DMS 32 coordinates power distribution. EMS 28 and DMS 32 include applications such as automatic generation control (AGC), load forecasting, capacitor bank switching controls, engineering load flow modeling, economic dispatch, energy accounting, interchange transactions, reserve calculations (spin and non-spin), and VAR/voltage control. DRMS 30 controls peak demand and produces other economies without major inconvenience to the customer. In some embodiments, DRMS 30 is added as a function of the EMS 28 because of its use in controlling overall peak demand and generation requirements. Further DMS 32 includes functions and capabilities that may improve the reliability and efficiency of the power distribution system.

Figure 2:
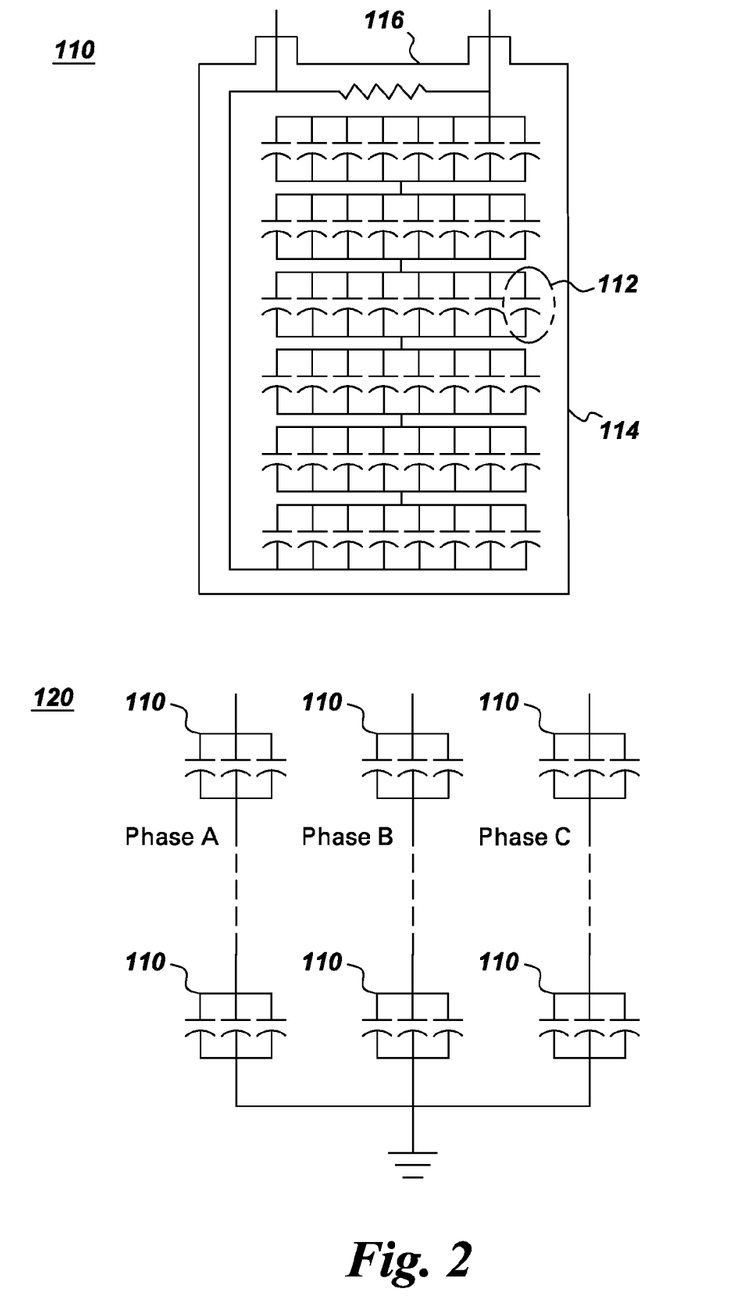
FIG. 2 is a diagrammatical representation of a capacitor bank and a capacitor unit.

FIG. 2 shows a capacitor unit 110 which is a building block of a capacitor bank 120. Capacitor bank 120 is configured using one or more series groups of parallel connected capacitor units 110 per phase. Capacitor unit 110 is made up of individual capacitor elements 112, arranged in parallel/series connected groups, within a steel enclosure 114. In one embodiment an internal discharge device 116 in capacitor unit 110 is used when needed to reduce residual voltage. For example, an appropriately sized resistor may be used for reducing the unit residual voltage by 50 V or less in 5 minutes. Capacitor units 110 are available in a variety of voltage ratings, typically 240 V to 24940V, and sizes 2.5 kvar to about 1000 kvar, for example.

Figure 3:
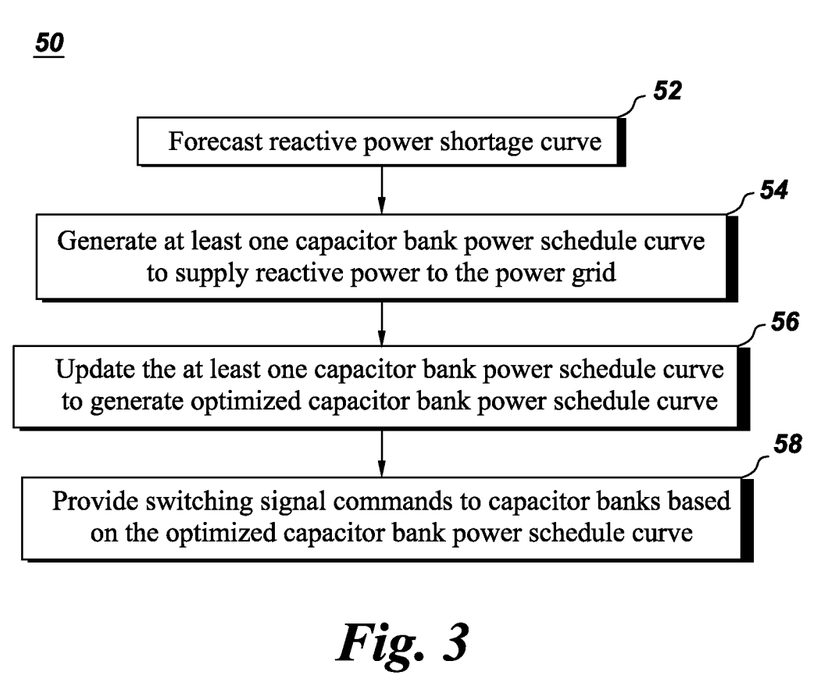
FIG. 3 is a flow chart representing a method of operating capacitor banks in a power grid in accordance with an embodiment of the present invention.

FIG. 3 shows a method 50 of operating capacitor banks in the power grid in accordance with an embodiment of the present invention. The method may be employed by the DMS 32 or EMS 28 (FIG. 1), for example, and includes obtaining a forecast for reactive power shortage in step 52. The reactive power shortage forecast may be obtained by subtracting total reactive power being generated by reactive power sources from the total reactive power demand for a time period or period of interest based on a desired power factor. In one embodiment, the reactive power sources may include capacitor banks that are already connected to the system. The reactive power forecast may be determined in terms of MVA loading which is indicative of active as well as reactive power for a particular zone. In one embodiment, the period of interest may be an hour, a day, a week, or any other suitable time determined by the user or the operator. In another embodiment, the reactive power forecast is determined for k time steps into the future, where k is again a number determined by the operator. As will be appreciated by those skilled in the art, reactive power forecasting methods may include similar day approaches, various regression models, time series approaches, neural networks, expert systems, fuzzy logic, and statistical learning algorithms.

Figure 4:
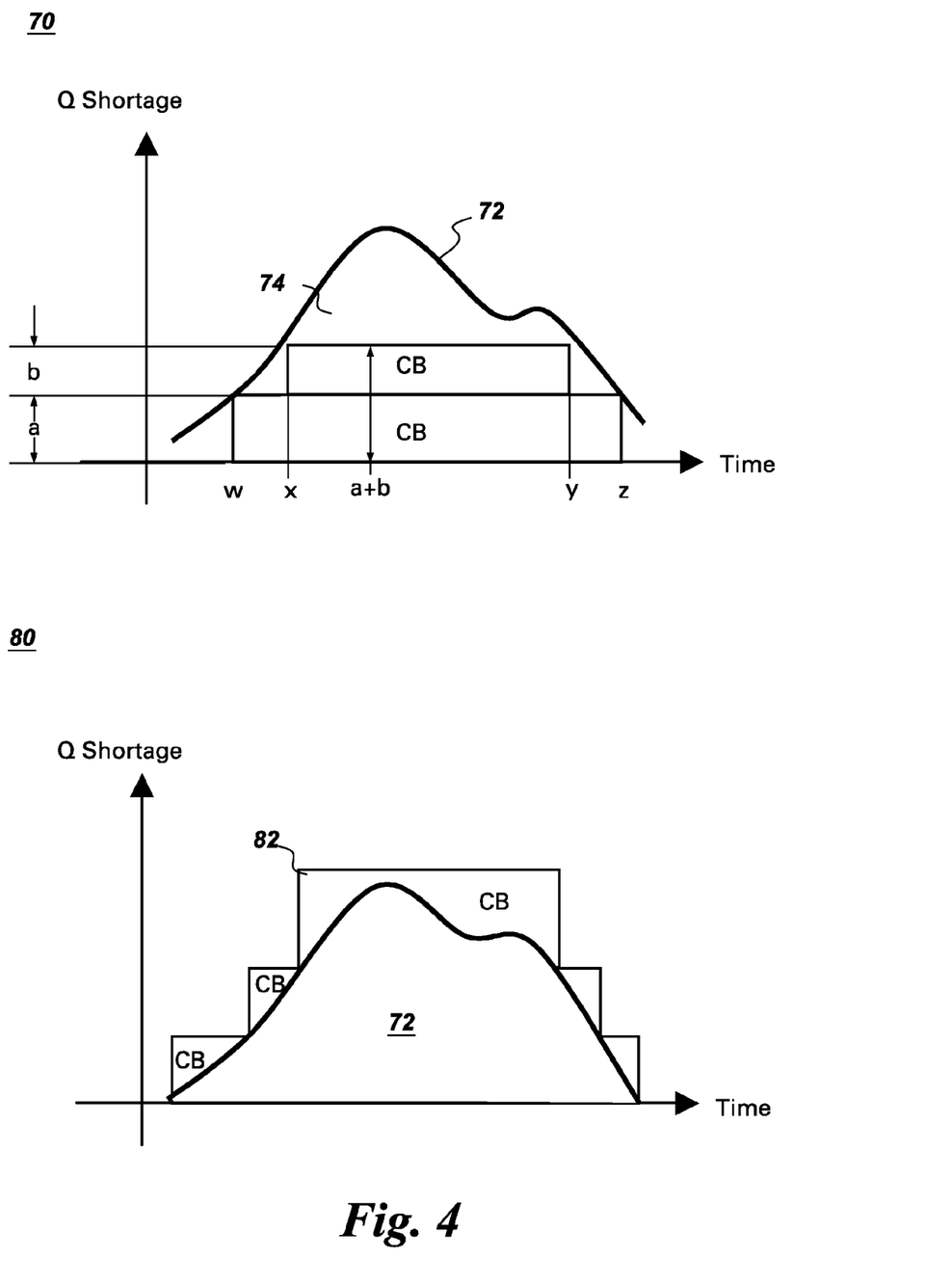
FIG. 4 is a graphical representation of under-coverage and over-coverage capacitor bank power schedule curves.

In step 54, at least one capacitor bank power schedule curve may be generated to supply power to the power grid during the period of interest. In one example, the at least one capacitor bank power schedule curve may comprise a curve representative of reactive from scheduling of a single capacitor bank. For example, if a capacitor bank with a rating of 100 kVAr is scheduled to operate from morning 8 to 11 then the capacitor bank power schedule curve will be a rectangle with amplitude of 100 kVAr for that period. In a given zone there may be a number of capacitor banks having similar and/or different ratings. Thus, in one embodiment, the capacitor bank power schedule curve refers to a power curve obtained from the reactive power generated by the capacitor banks as the capacitor banks are switched on in accordance with the switching schedule. In another embodiment, the power curve may also be obtained from the reactive power generated by capacitor banks of different zones when capacitor banks are shared between two or more different zones. For example, if a zone has more capacitor banks reactive power available compared to the reactive power demand of that zone then it can share its reactive power with other zones who have reactive power shortages. Since there are a number of capacitor banks, the capacitor banks may be switched in multiple different combinations for the period of interest resulting into a plurality of potential capacitor bank power schedule curves. Thus, in step 54 all such capacitor bank power schedule curves of different combinations of capacitor banks may be determined. The capacitor bank power schedule curve may either be an under-coverage curve or an over-coverage curve. In an under-coverage curve, the limits of the capacitor bank power schedule curve are within the reactive power shortage curve, whereas, in an over-coverage curve, the limits of the capacitor bank power schedule curve are outside of the reactive power shortage curve. FIG. 4 describes under-coverage and over-coverage curves in more detail.

In step 56, the at least one capacitor bank power schedule curve is updated to generate an optimized capacitor bank power schedule curve for reducing or minimizing the area between the reactive power shortage curve and the capacitor bank power schedule curve. Updating the at least one capacitor bank power schedule curve includes adding more capacitor banks into the system at different times. Optimization techniques such as dynamic programming, a greedy algorithm, or a branch and bound algorithm may be employed to determine the optimized capacitor bank power schedule curve. Reducing the area between the reactive power shortage curve and the capacitor bank power schedule curve has been found to result in reactive power compensation being achievable with less capacitor bank switching events as compared with convention capacitor bank control embodiments. For example, rather than switching a particular capacitor bank 7-8 times during the time period, the optimization technique may result in switching the capacitor bank only once or twice throughout the time period. Once the optimized capacitor bank power schedule curve is determined, the information may be utilized in step 58 for operating the capacitor banks by providing appropriate switching signal commands to the capacitor banks.

FIG. 4 shows graphical illustrations 70, 80 of under-coverage and over-coverage capacitor bank power schedule curves respectively. In both plots 70, 80, a reactive power shortage curve is shown by curve 72. In plot 70, two capacitor banks are used to supply the reactive power demand over a period of time whereas in plot 80, three capacitor banks are used as shown. Further, in plot 70, a capacitor bank power curve 74 generated by two capacitor banks is within the bounds of reactive power shortage curve 72 and is hence an under-coverage curve, whereas in plot 80 a capacitor bank power curve 82 is outside of the limits of reactive power shortage curve 72 and hence represents an over-coverage curve.

To describe under coverage curve in more detail, capacitor bank curve 74 is generated with two capacitor banks supplying reactive power from time w to z. A first capacitor bank CB1 of rating p kVAr is switched on from time w to z whereas, a second capacitor bank CB2 of rating q kVAr is switched on from time x to y which is shorter than the time w to z. Thus, the resultant capacitor bank curve 74 has an amplitude of p kVAr from time w to x and y to z when it is operating alone whereas the amplitude goes up to p+q kVAr from time x to y when both capacitor banks are supplying reactive power to the grid.

Figure 5:
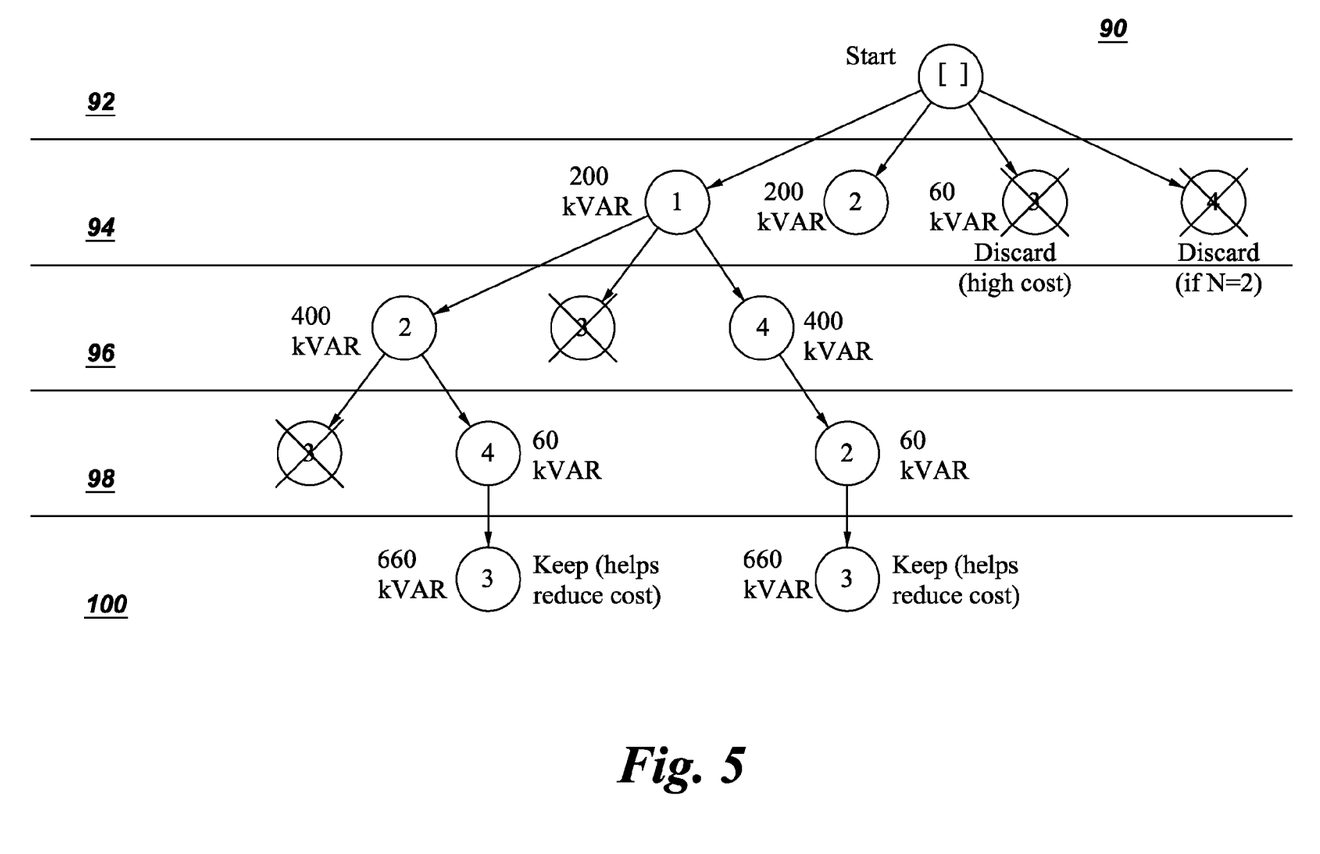
FIG. 5 is a graphical representation describing a branch and bound optimization method in accordance with an embodiment of the present invention.

FIG. 5 describes a branch and bound optimization method 90 of minimizing the area between the reactive power shortage curve and the capacitor bank power schedule curve with reduced capacitor banks switchings. The branch-and-bound (BB) method is based on the idea of intelligently enumerating all the feasible points of a combinatorial optimization problem. As will be appreciated by those skilled in the art, in BB method, we try to construct a proof that a solution is optimal based on successive partitioning of the solution space. The branch in BB corresponds to the partitioning process, and the bound refers to the lower bounds that are used to construct a proof of optimality without exhaustive search. For this particular example assume that there is a set of four capacitor banks (CBs) in a particular power grid zone, CB1 with capacity of 200 kVAr, CB2 with 200 kVAr, CB3 with 60 kVAr and CB4 again with 200 kVAr respectively. The circles in FIG. 5 correspond to subsets of CBs. The circle at the top in step 92 is the starting point, the empty subset (i.e., No CBs). At each step, the selected circle is labeled as parent and its children are found by adding one CB at a time that has not been in the subset yet. Further, at each step a number of subsets are selected for further investigation into the next step. The subsets selected (represented by the circles that are not crossed out) depend on their cost and beam width. The beam width here refers to the number of branches which are selected by the operator and is part of bounding the algorithm. The cost is generally a representation of area difference between the reactive power shortage curve and the capacitor bank power schedule curve. For example, the more the area difference, the higher the cost.

Step 94 of FIG. 5, shows four subsets with only one parent CB (CB1 or CB2 or CB3 or CB4) i.e., only one capacitor bank is supplying power to the grid for a particular period of time. In step 94, only a pre-defined number of these ordered subsets are selected. In one embodiment, only the subsets with minimal costs are selected. In the example shown, the beam width selected is 2. Thus, at each step only 2 subsets are selected and the cost of the ordered subset at each step is determined. Bounding the number of branches off the parent CB based on the beam width decreases the complexity of the algorithm compared to a more exhaustive search. However, such bounding may leads to a suboptimal solution. The optimality of the solution increases with the increased beam width. Thus, the operator selects the beam width based on the optimal solution requirement.

For determining the cost of the ordered subset, the following equation may be used.

$$p_c = A - \sum_{i}^{D} p_i \quad (1)$$

wherein A is the area under the reactive power shortage curve, D is the total number of capacitor banks in the subset, and $p_i$ is the profit or actual reactive power supplied by an $i^{th}$ capacitor bank over a certain period of time. In one embodiment, the profit $p_i$ of a capacitor bank can be determined by following equation:

$$p_i = w_i l_i \quad (2)$$

wherein $w_i$ is the weight or capacity of the $i^{th}$ capacitor bank, and $l_i$ is the length or the time duration for which the capacitor bank may be switched on to supply the reactive power to the grid during reactive power shortage. The length $l_i$ is calculated by finding points in time where the cumulative reactive power supplied by the $i^{th}$ CB and CBs prior to $i^{th}$ CB in schedule is lower than the reactive power shortage curve.

For example, in the embodiment of FIG. 5, in step 94 it is first determined which of the subsets 1 (CB1), 2 (CB2), 3 (CB3) and 4 (CB4) have lower costs. If the peak reactive power shortage curve is a parabolic curve with peak of 660 kVAr, then the cost of subset 1, 2, and 4 may be lower compared any combination including subset 3. Thus, subset 3 is discarded due to its high cost. Further, since the beam width is 2, even though subset 4 has similar cost as that of subset 1 and subset 2, it is discarded too. Referring back to FIG. 4, subset 1 is selected means at first level CB1 is assumed to be operated from a time period w to z.

Now the step 96 has two subsets with two starting capacitor banks CB1 and CB2 respectively. With respect to the subset starting with capacitor bank CB1 in step 96, remaining capacitor banks CB2, CB3 and CB4 are added to that subset for updating the capacitor bank scheduling curve. The cost of each of these combinations or updated curves (i.e., CB1+CB2 or CB1+CB3, or CB1+CB4) is again determined and the lowest cost combination or combinations are selected as subsets for further calculations in step 98 with beam width of 2. As can be seen from FIG. 5, CB2 and CB 4 are added to the two different subsets or branches respectively. Similar calculations and branching (not shown) may also be done for the subset starting with CB2 in Step 94. Cost calculation and updating the subset with more capacitor banks to reduce the cost is repeated in steps 98 and 100 until the desired reactive power is met. Again referring back to FIG. 4, it can be seen that at level 2, capacitor bank CB2 is added to CB1 from time period x to y to increase the total reactive power to p+q kVAr and minimize the area between reactive power shortage curve and capacitor bank reactive power curve. The steps are repeated until one is short of number capacitor banks or the area difference achieved is minimum.

The above description of BB algorithm takes into account the under-coverage curve. For the over-coverage curve, the method is similar to the under-coverage curve algorithm except that the optimization problem is formulated to minimize the difference between the area covered by CBs and the shortage curve instead of the difference between the shortage curve and CBs and the length is calculated based on mechanisms similar to those of under-coverage curve.

In certain embodiments, it may be necessary to divide the reactive power shortage curve in multiple curves of small durations. For example, rather than having a single 24 hour curve, the curve may be split into 6 curves of 4 hours each, and the above algorithm may then be employed on each of the curves separately. In such situations it is helpful to calculate the number of capacitor bank switching events, i.e., how many times a capacitor bank is being switched on and off and to restrict the number of events per time period to a number decided by the operator. This may be necessary because capacitor bank lifetime depends on the number of switching events per day.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating capacitor banks in a power grid comprising:
    obtaining a reactive power shortage curve forecast for a time period;
    generating at least one capacitor bank power schedule curve to supply reactive power to the power grid during the time period;
    updating the at least one capacitor bank power schedule curve to generate an optimized capacitor bank power schedule curve for reducing the area between the reactive power shortage curve and the capacitor bank power schedule curve; and
    providing switching signal commands for operating capacitor banks based on the optimized capacitor bank power schedule curve.

2. The method of claim 1, wherein obtaining the reactive power shortage curve forecast comprises utilizing at least one of a regression algorithm, a time series algorithm, a neutral network algorithm, a fuzzy logic algorithm or a statistical learning algorithm.

3. The method of claim 1, wherein updating the at least one capacitor bank power schedule curve comprises utilizing an optimization technique to optimize the capacitor bank power schedule curve.

4. The method of claim 3, wherein the optimization technique comprises a dynamic programming algorithm, a greedy algorithm or a branch and bound algorithm.

5. The method of claim 4, wherein the branch and bound (BB) algorithm comprises identifying at least one least cost capacitor bank subset.

6. The method of claim 5, wherein the identifying at least one least cost capacitor bank subset comprises updating the at least one capacitor bank subset by adding child capacitor banks to parent capacitor banks.

7. The method of claim 6, wherein identfying at least one least cost capacitor bank subset comprises constratining a capacitor bank subset based on a beam width.

8. The method of claim 7, wherein the beam width is selectable by an operator.

9. The method of claim 5, wherein identifying at least one least cost capacitor bank subset is based on an area difference between the reactive power shortage curve and the capacitor bank power schedule curve.

10. The method of claim 1, wherein the capacitor bank power schedule curve comprises an under-coverage curve or an over-coverage curve.

11. The method of claim 10, wherein, when the capacitor bank scheduling curve comprises under-coverage curve, the BB algorithm reduces the difference between the reactive power shortage curve and the capacitor bank scheduling curve.

12. The method of claim 10, wherein, when the capacitor bank scheduling curve comprises over-coverage curve, the BB algorithm reduces the difference between the capacitor bank scheduling curve and the reactive power shortage curve.

13. The method of claim 1 further comprising dividing the reactive power shortage curve in multiple curves of small durations during the time period.

14. The method of claim 13, wherein a number of switching signal commands for at least one capacitor bank during the time period are restricted.

15. The method of claim 1, wherein capacitor banks are shared between two or more power grid zones.

16. A power grid system comprising:
    a plurality of capacitor banks;
    a capacitor bank switching system comprising:
        a load forecast module to obtain a reactive power shortage curve for a time period;
        a capacitor bank scheduling module for generating at least one capacitor bank power schedule curve to supply reactive power to the power grid during the time period;
        an optimization module for updating the at least one capacitor bank power schedule curve and generating an optimized capacitor bank power schedule curve to reduce the area between the reactive power shortage curve and the capacitor bank power schedule curve; and
        a control circuitry for providing switching signal commands for operating capacitor banks based on the optimized capacitor bank power schedule.

17. The power grid system of claim 16, wherein the optimization technique comprises a dynamic programming algorithm, a greedy algorithm or a branch and bound algorithm.

18. The power grid system of claim 17, wherein the branch and bound (BB) algorithm identifies at least one least cost capacitor bank subset.

19. The power grid system of claim 18, wherein at least one least cost capacitor bank subset is identified based on an area difference between the reactive power shortage curve and the capacitor bank power schedule curve.

20. A computer-readable medium comprising non-transitory computer-readable instructions of a computer program that, when executed by a processor, cause the processor to perform a method of operating capacitor banks in a power grid comprising:
    obtaining a forecast for a reactive power shortage curve for a time period;
    generating at least one capacitor bank power schedule curve to supply reactive power to the power grid during the time period;
    updating the at least one capacitor bank power schedule curve to generate an optimized capacitor bank power schedule curve for reducing the area between the reactive power shortage curve and the capacitor bank power schedule curve; and
    providing switching signal commands for operating capacitor banks based on the optimized capacitor bank power schedule.

* * * * *